US 6,547,437 B2

(12) United States Patent
Kamimura et al.

(10) Patent No.: US 6,547,437 B2
(45) Date of Patent: Apr. 15, 2003

(54) CURVILINEAR MOTION GUIDE UNITS

(75) Inventors: Akihiko Kamimura, Kanagawa-ken (JP); Norimasa Agari, Gifu-ken (JP); Toyohisa Ishihara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 10 days.

(21) Appl. No.: 09/785,210

(22) Filed: Feb. 20, 2001

(65) Prior Publication Data

US 2001/0017951 A1 Aug. 30, 2001

(30) Foreign Application Priority Data

Feb. 29, 2000 (JP) ........................................ 2000-053275

(51) Int. Cl.[7] .............................................. F16C 29/06
(52) U.S. Cl. .............................. 384/45; 384/13; 384/15; 384/451
(58) Field of Search .......................... 384/13, 15, 45, 384/451

(56) References Cited

U.S. PATENT DOCUMENTS

| | | | | |
|---|---|---|---|---|
| 4,610,488 A | * | 9/1986 | Geka ............................ | 384/45 |
| 4,797,012 A | * | 1/1989 | Tanaka ......................... | 384/45 |
| 4,844,624 A | * | 7/1989 | Teramachi .................... | 384/43 |
| 5,375,931 A | * | 12/1994 | Teramachi .................... | 384/45 |
| 5,411,334 A | * | 5/1995 | Takei et al. ................... | 384/45 |
| 5,921,682 A | * | 7/1999 | Kitade .......................... | 348/478 |

FOREIGN PATENT DOCUMENTS

| | | |
|---|---|---|
| JP | 11213/1987 | 3/1987 |
| JP | 101914/1987 | 5/1987 |
| JP | 186028-1988 | 8/1988 |
| JP | 2809/1992 | 1/1992 |
| JP | 21440/1996 | 1/1996 |
| JP | 21441/1996 | 1/1996 |
| JP | 30638/1998 | 2/1998 |

* cited by examiner

*Primary Examiner*—Christopher P. Schwartz
*Assistant Examiner*—Xuan Lan Nguyen
(74) *Attorney, Agent, or Firm*—Browdy and Neimark, P.L.L.C.

(57) ABSTRACT

In a curvilinear motion guide unit in which sliders are allowed to move along a track rail extending curved with a preselected curvature, this unit makes the slider reduced in size with well balance. An end cap may be made common in specification to a variety of sliders, which are modified in specification depending on diverse variations in curvature of track rail. To this end, a casing for the slider has forward and aft end faces that are arranged, regardless of the variations in length of the casing, such that imaginary planes including the end faces and normal to a top surface of the track rail coincide with radial planes extending through the center of curvature of the track rail. The return passages are opened on the forward and aft end faces at locations that are closer to the centroidal axis of the track rail than the loaded raceways. Moreover, the return passages are linear bores that run straight through the casing.

20 Claims, 7 Drawing Sheets

CURVILINEAR MOTION GUIDE UNITS

BACKGROUND OF THE INVENTION

1. Field of the Invention

The present invention relates to a curvilinear motion guide unit, which is comprised of a track rail extending lengthwise curved with a preselected curvature, and a slider arranged for a curvilinear motion along the track rail by virtue of rolling elements.

2. Description of the Prior Art

Recently various types of bearing guide unit have been used incorporated between components movable relatively of each other in modern advanced machine tools, conveyors, industrial robots, transfer machines, assembling apparatus, semiconductor fabricating apparatus, and so on.

Disclosed in Japanese Patent Laid-Open No. 101914/1987 is bearing means for revolving motion, which comprises a guide rail curved to have a preselected radius of curvature and provided on both radially opposing sides thereof with raceway grooves for load areas through which balls are allowed to run, a slider having two confronting legs that are made on inwardly faced surfaces thereof with raceway grooves for load areas conforming in curvature with the raceway grooves on the guide rail, and turnaround means for non-loaded areas where the balls are allowed to recirculate through there. The prior bearing means has a detachable cover, which can be opened to take the balls in and/or out of the slider. The cover when closed keeps the balls against falling away from the slider. Moreover, the turnaround means for non-loaded areas is provided by a tubular member of J-pattern, which is divided into halves opposing to one another.

Another Japanese Patent Laid-Open No. 186028/1988 discloses a curvilinear sliding-motion bearing system equivalent in construction with the bearing means for revolving motion cited just above, in which a slider containing rolling elements therein can move along a circular guide rail. The known curvilinear sliding-motion bearing system is designed for sliding components in devices and systems as diverse as machine tools, industrial robots, any conveying systems or the like to guide or transfer commodities or parts along any curvilinear line from a home or reference station to any other demand positions. The curvilinear sliding-motion bearing system is comprised of a movable platform provided therein with both raceway grooves for load areas and other raceway grooves for non-loaded areas, which are connected one another through turnarounds in end covers attached to the platform, to form endless raceways allowing rolling elements to recirculate through them, and a track rail made with raceway grooves confronting the raceway grooves in the platform to provide the load areas of the recirculation passages for the ball. The track rail is formed in arc or circle, and the confronting raceway grooves for the load areas in the platform and on the track rail are made so as to describe imaginary circles having centers of curvature, which are common to each other and also in alignment with the center of curvature of an imaginary circle along the track rail. Thus, the rolling elements or balls can run through the load areas defined between the confronting raceway grooves, while continuing to carry loads in all directions. With the curvilinear sliding-motion bearing system stated earlier, the adjustment of pre-loading can be performed by selecting balls somewhat larger in size than the clearance between the confronting raceway grooves for the load areas, or varying the clearance between the confronting raceway grooves by tightening bolts.

Moreover, a recirculating-curvilinear motion bearing system for revolving motion has been known in, for example, Japanese Patent Publication No. 11213/1987, in which bearing blocks movable along a circular track rail are arranged at angular intervals around the circular track rail. The circular track rail is made on only radially outside surface thereof with two rows of raceway grooves while the bearing block is also made on only its inside with two rows of raceway grooves confronting the raceway grooves on the track rail to form between them load areas through which balls run to carry the load. The bearing block has return passages of non-loaded areas for recirculating the balls. The balls in the load areas come in rolling contact with the associated raceway grooves at two radially opposing sectorial portions thereof. With the bearing system for revolving motion described just above, the bearing blocks can revolve around the radially outside of the circular track rail by virtue of balls. An eccentric bolt is arranged between the bearing block and a turntable mounted on the bearing block to urge the bearing block towards the circular track rail, adjusting finely the pre-loading.

Another type of curvilinear motion rolling guide unit has been developed, as unveiled in for example Japanese Patent Laid-Open No. 30638/1998, in which a slider is installed for sliding movement on a curved spline shaft extending lengthwise with a desired curvature. In the prior curvilinear motion rolling guide unit, the slider has a casing that is slashed off diagonally at lengthwise opposing ends thereof, which thus come perpendicular to the centroidal axis of the spline shaft. While the casing is more subjected at its radially outside half to the load than at its radially inside half, the outside half is longer lengthwise than the inside half because the opposing ends are tilted whereby the load may be made balanced between the inside and outside halves. Similar curvilinear motion guide units to that stated earlier are further disclosed in Japanese Patent Laid-Open Nos. 21441/1996 and 21440/1996.

In addition, a recirculating-ball linear motion bearing system has been known as in, for example, Japanese Patent Publication No. 2809/1992, which is comprised of an elongated track rail of rectangular shape in cross section having on its widthwise opposing upright surfaces raceway grooves, each to each upright surface, and a slider casing made with raceway grooves confronting the raceway grooves on the track rail, and rolling elements arranged in load areas defined between the confronting raceway grooves to allow the slider casing to move linearly. For recirculation of the rolling elements, return passages for non-loaded areas are made in the slider casing at locations above any upper shoulders of the track rail and closer to the centroidal axis than the shoulders of the track rail.

To this day, yet a variety of curvilinear motion guide units for moving the slider along the curved guide way have been conventionally proposed as stated earlier, and no commercially viable curvilinear motion guide unit has been developed. In the curvilinear motion guide unit where the track rail extends curved with a preselected curvature, the application of the slider similar in construction to the slider currently available for the prior linear-motion rolling guide units becomes problematic because the raceway grooves on the slider needs extending curved in compliance to the track rail and, therefore, the slider is required to afford to provide the return passages in the widthwise inward/outward areas. This causes a corresponding increase in widthwise dimension of the casing for the slider, thus, resulting in the major problem of failing in making the slider slim or compact with well balance. With the prior curvilinear motion guide units, moreover, it is required to always stock a variety of end caps different in specification depending on the diverse specifications of the curvature of the track rail and the overall length of the slider. This eventually raises disadvantages of increasing the number of parts required and rendering the management of parts and components much complicated.

SUMMARY OF THE INVENTION

The present invention, therefore, has as its primary object to overcome the major problem in the prior curvilinear motion guide units in which a slider can move along a track rail extending curved with a preselected curvature. More particular, it relates to a curvilinear motion guide unit in which the slider has a casing modified in location where return passages are arranged and in configuration of lengthwise opposing ends, thereby reducing an overall widthwise dimension of the slider to make the casing compact or slim in size. The improved curvilinear motion guide unit of the present invention makes it possible to adopt virtually identical end caps just as they are, even if the curved track rail varies in curvature and/or overall length, thereby making each part for the specific end cap interchangeable. Accordingly, the slider movable along the curved track rail may be made compact or slim with well balancing and further the control of parts and components can be simplified to be economical.

The present invention is concerned with a curvilinear motion guide unit comprising a track rail extending curved with a preselected curvature and having lengthwise sides made thereon with first raceway grooves, and a slider fitting astride over the track rail for movement in a sliding manner along the track rail; wherein the slider is comprised of a casing provided with second raceway grooves extending curved in conformity with the first raceway grooves and return passages formed corresponding to the second raceway grooves, end caps mounted on forward and aft end faces of the casing, each to each end face, and provided therein with turnarounds connecting the second raceway grooves to the return passages, rolling elements running through recirculating passages composed of curved raceways defined between the first and second raceway grooves, the turnarounds and the return passages, and end seals attached on the end caps, each to each cap; and wherein the forward and aft end faces of the casing are each arranged such that an imaginary plane including any one of the end faces and normal to a top surface of the track rail coincides with a radial plane extending through the center of curvature of the track rail, and the return passages are opened on the forward and aft end faces at locations that are closer to a centroidal axis of the track rail than locations where the raceways are made open on the forward and aft end faces.

With the curvilinear motion guide unit constructed as stated earlier, where the return passages in the casing are made open on the end caps and the raceways are made open on the end caps always remain in preselected locations irrespective of the variations in curvature of the track rail. Moreover, the turnarounds are also made in the end caps at locations that are predetermined in conformity with the locations on the end caps where the return passages and raceways are made opened.

In accordance with one aspect of the present invention, a curvilinear motion guide unit is disclosed, wherein the lengthwise sides of the track rail are radially outside and inside curved surfaces having a common center of curvature coinciding with the center of curvature of the track rail.

In accordance with another aspect of the present invention, a curvilinear motion guide unit is disclosed, wherein the slider fits astride over radially outside and inside rims of the track rail to conform the track rail, and the return passages are made opened on the forward and aft end faces at locations that are above the outside and inside rims of the track rail and closer to the centroidal axis of the track rail than the outside and inside rims of the track rail. Moreover, the slider has widthwise opposing side surfaces extending lengthwise of the slider in parallel with each other.

With the curvilinear motion guide unit constructed as stated earlier, the casing of the slider has the forward and aft end faces included in planes extending through the center of curvature of the track rail and normal to the top surface of the track rail. That is to say, even when the casing is modified in length along the track rail depending on the variations in specifications of the curvature of the track rail and corresponding changes in overall length of the slider, the forward and aft end faces of the casing always remain residing in planes extending through the center of curvature of the track rail and normal to the top surface of the track rail. This makes the end caps interchangeable, allowing the end caps with the turnarounds to be common in specification to a variety of the track rails modified in curvature. Moreover, the return passages are arranged closer to the centroidal axis of the track rail than the radially outside and inside sides of the track rail. Thus, the casing has not to arrange the return passages widthwise outwardly beyond the radially outside and inside sides of the track rail. As a result, since the return passages may be made opened at the same locations on the end faces regardless of the variations in curvature of the track rail, the end caps can be made interchangeable to the units modified in specification. In addition, the casing may be made reduced widthwise in size with well balance.

In accordance with another aspect of the present invention, a curvilinear motion guide unit is disclosed, wherein the end caps are each provided therein with a claw to scoop the rolling elements out of the associated raceway, while the first raceway grooves on the track rail are each made with a channel in which a claw fits for movement. The claws formed in the end caps travel in the channels at the bottoms of the first raceway grooves during curvilinear movement of the slider to scoop the rolling elements out of the raceway grooves and transfer them to the turnarounds in the end caps, helping ensure the smooth recirculation of the rolling elements. Then, the claws lead gently the rolling elements out of the turnarounds into the raceways, allowing the rolling elements to land softly in the raceways.

In accordance with a further another aspect of the present invention, a curvilinear motion guide unit is disclosed, wherein both a top surface and any one of the side surfaces of the casing include planar reference surfaces for mounting to locate with precision other member that is to be mounted to the casing. Moreover, the casing includes mounting surfaces on which the other member is fixed, the mounting surfaces being drilled with threaded holes. Thus, positioning of the casing to the other member will be simply made with accuracy, and further, fixing the other member to the mounting surface may be also made easily by only driving the bolts into the threaded holes with the other member being kept in place.

In accordance with another aspect of the present invention, a curvilinear motion guide unit is disclosed, wherein the return passages made in the casing are linear bores that run straight through the casing from any one of the forward and aft end faces to the other. Thus, the return passages extend in parallel with the direction of the tangent, or the chord, at a sliding point on the track rail along which the slider moves. Such linear passages may be simply bored by the use of any conventional boring machines. Rolling elements led into the return passages from the turnarounds in any one of the end caps are allowed to run by the shortest route to the other turnarounds.

In accordance with another aspect of the present invention, a curvilinear motion guide unit is disclosed, wherein the casing is made with admission holes through which a desired number of the rolling elements may be charged into the recirculating passages, and the admission holes are communicated to the return passages and may be closed with plugs. According to the construction described just above, the desired number of the rolling elements are first fed into the return passages and then reach the raceways through the turnarounds. The plugs to close the admission holes are to keep the charged rolling elements from going back out of the admission holes. Moreover, the plugs serve to prevent foreign matter such as dust and dirt from entering into the recirculating passages, and to keep lubricant such as grease from leakage.

In accordance with another aspect of the present invention, a curvilinear motion guide unit is disclosed, wherein the end cap is cut deep to form a slit open to the side facing the track rail so that the end cap, when fitting astride over the track rail, may be stretched apart at the slit to be easily placed over the track rail.

In accordance with another aspect of the present invention, a curvilinear motion guide unit is disclosed, wherein the end seal is composed of a rubber plate and a metal backing plate bonded to the rubber plate, the metal backing plate being comprised of a pair of backing halves to be stretched apart from each other when the end seal is placed astride over the track rail. With the end seal constructed as described earlier, the rubber plate may flex at the middle area to place easily the end seal over the track rail.

In accordance with a further another aspect of the present invention, a curvilinear motion guide unit is disclosed, wherein the track rail is formed in a loop, over which the sliders ride astride for curvilinear movement. With the curvilinear motion guide unit constructed as stated just above, the guide unit may be used between the members, for example base and turntable, rotating relative to one another with the base being fixed to the track rail while the turntable being mounted to the slider. An unitary member might be mounted to all of the sliders or, in contrast, many members might be mounted some sliders.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
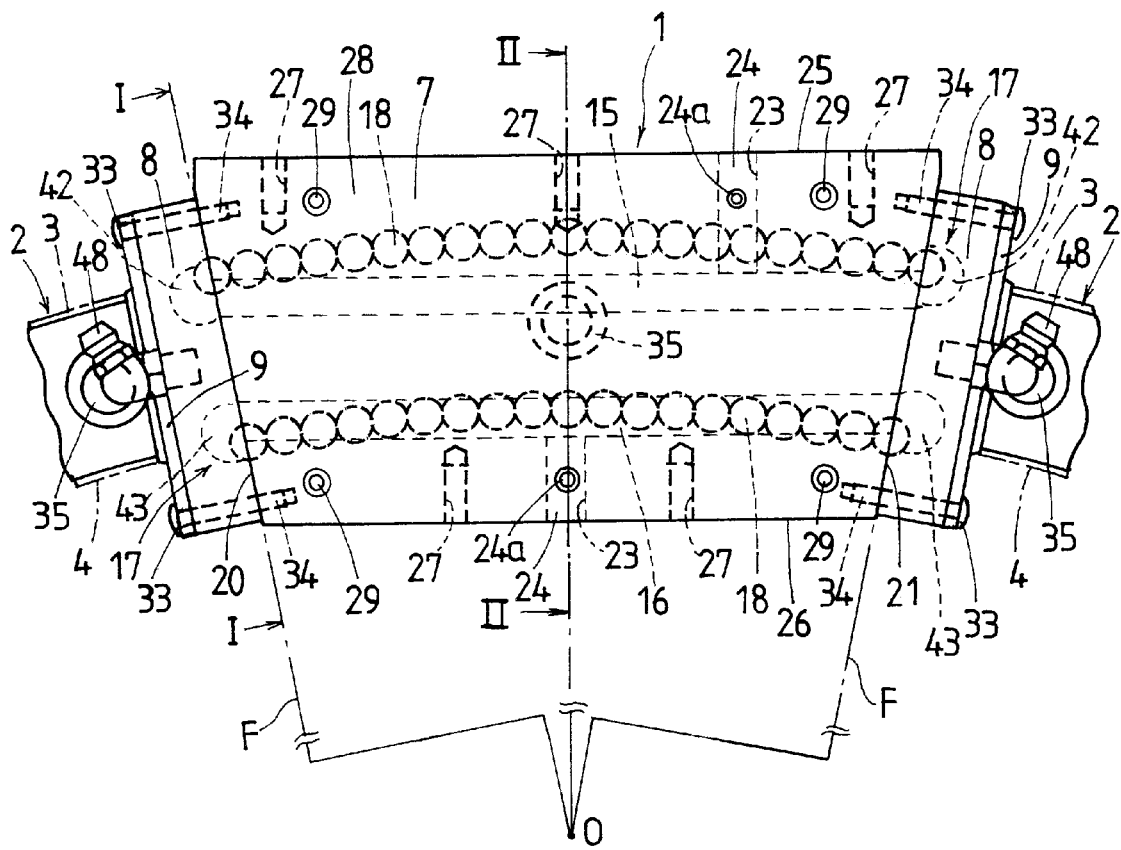
FIG. 1 is a plan view showing a preferred embodiment of a curvilinear motion guide unit according to the present invention.

A curvilinear motion guide unit according to the present invention will be explained below in detail in conjunction with the accompanying drawings.

A curvilinear motion guide unit embodying the present invention, as shown in FIGS. 1 to 4, is comprised of a track rail 2 extending lengthwise curved with a preselected curvature, and a slider 1 riding astride a pair of radially inside and outside rims 3a, 4a of the track rail 2 for curvilinear movement along the track rail 2. Raceway grooves or first raceway grooves 5, 6 are made on radially outside and inside arced surfaces 3, 4 of the track rail 2, one to each arced surface.

The slider 1 is concaved fore-and-aft to form a recess 10 to which the track rail 1 conforms when the slider 1 fits astride over the track rail 1. The slider 1 has a major slider body of a casing 7, end caps 8, 8 mounted on forward and aft end faces of the casing 7, each to each end face and provided therein with turnarounds 42, 43 (refer to FIG. 6) where rolling elements 18 are allowed to do an about-face, and end seals 9, 9 attached on the end caps 8, 8, each to end cap, to close clearances S between the track rail 2 and the slider 1.

The casing 7 is made therein with second raceway grooves 11, 12, which are arranged confronting the first raceway grooves 5, 6 on the radially outside and inside lengthwise surfaces 3, 4 while having a center of curvature geometrically coinciding with the center 0 of curvature of the curved track rail 2. The casing 7 is also made with return passages 15, 16, which are arranged spaced away from the second raceway grooves 11, 12. As well seen from FIG. 1, all the first raceway grooves 5, 6 on the track rail 2 and the second raceway grooves 11, 12 in the casing 7 are designed so as to have the common center 0 of curvature. The rolling elements or balls 18 are allowed to run through load areas of raceways 13, 14, which are defined between the confronting raceway grooves 5, 11 or 6, 12. With the rolling elements 18 running through the loaded raceways 13, 14, the slider 1 can make the curvilinear motion with ease and accuracy. The rolling elements 18 are allowed to recirculate from the loaded raceways 13, 14 through non-loaded areas: the turnarounds 42, 43 and return passages 15, 16 to the same loaded raceways 13, 14.

Figure 3:
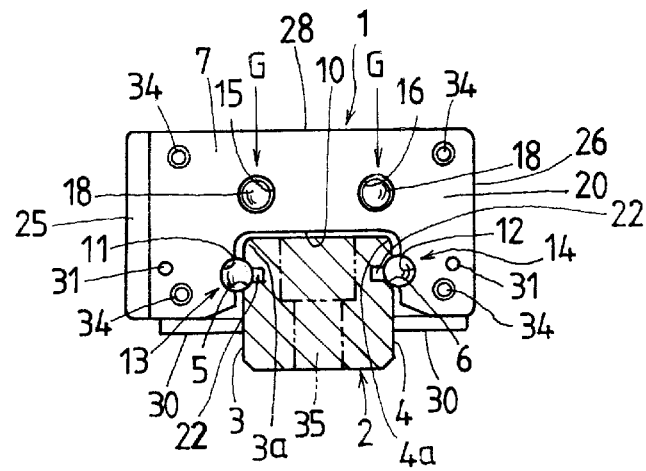
FIG. 3 is a cross-sectional view of the curvilinear motion guide unit shown in FIG. 1, the view being taken on the plane of the line I—I of that figure.

The casing 7 has forward and aft end faces 20, 21 on which the end caps 8 are held, each to each end face. The forward and aft end faces 20, 21 are disposed such that imaginary planes including the end faces 20, 21 and normal to a top surface of the track rail 2 coincide with radial planes F extending through the center of curvature of the track rail 2, as illustrated in FIG. 1. Moreover, the return passages 15, 16 for the non-loaded areas are opened on the forward and aft end faces 20, 21 at locations G that are, as shown in FIG. 3, closer to the centroidal axis of the track rail 2 than the loaded raceways 13, 14 with respect to the outside and inside rims 3a, 4a. As will be seen from FIG. 1, the return passages 15, 16 for non-loaded areas to recirculate the rolling elements 18 are linear bores that run straight through the casing 7 from any one of the forward and aft end faces 20, 21 to the other.

The casing 7 is also made with admission holes 23 through which the desired number of the rolling elements 18 may be charged or supplied into the return passages 15, 16. Thus, the admission holes 23 are closed with plugs 24 after the rolling elements 18 have been charged to keep the charged rolling elements 18 from falling off and lubricant such as grease from leakage. The plugs 24 are secured in the casing 7 with locking pins 24a.

A member such as a turntable, not shown, to support workpiece thereon is mounted to the slider 1. To this end, a radially outside surface 25, a radially inside surface 26 and a top surface 28 of the casing 7 are all made with threaded holes 27, 29 into which bolts, not shown, are screwed to fix the workpiece turntable, and so on, to the slider 1. Both the radially outside surface 25 and the top surface 28 of the casing 7 are made thereon with a sidewise reference surface and an upper reference surface for mounting with precision the turntable. The casing is mounted on lower surfaces thereof with bottom seals 30, each to each lower surface, which keep sliding engagement with the outside and inside surfaces 3, 4 of the track rail 2 as the slider 1 moves along the track rail 2, thereby protecting the loaded raceways 13, 14 against an invasion of foreign matter such as dust, dirt, debris, and so on.

The end caps 8 should be attached to the casing 7 with accuracy in location. To this end, the forward and aft end faces 20, 21 have thereon concavities 31 for accurate positioning, refer to FIG. 3, while the end caps 8 are each made with corresponding convexities 32, refer to FIG. 6. Fitting the convexities 32 in the concavities 31 makes it possible to bring the end caps 8 with ease into precise alignment with the casing 7. Thus, the end caps 8 are kept at a preselected location with respect to the casing 7 and secured to the casing 7 with fixing bolts 33, which are screwed into threaded holes 34 drilled in the forward and aft end faces 20, 21 of the casing. The end seals 9 are also mounted at the same time the end caps 8 are secured with the fixing bolts 33.

Figure 4:
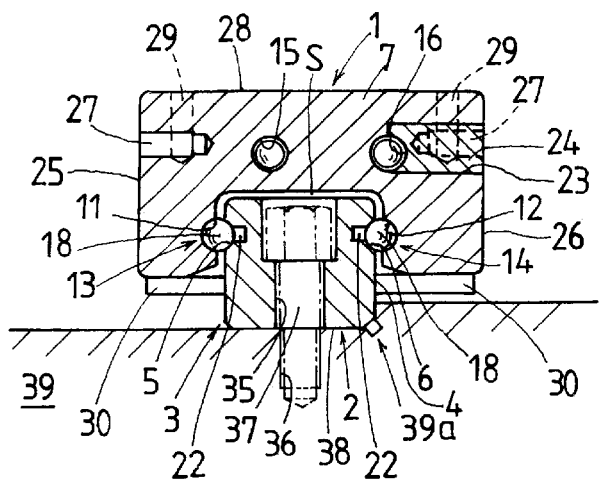
FIG. 4 is a cross-sectional view of the curvilinear motion guide unit shown in FIG. 1 taken on the plane of the line II—II of that figure.

The curved track rail 2 is made with through-holes 35 boring vertically, which are arranged spaced away from each other with an interval lengthwise of the curved track rail 2. The track rail 2 should be fixed with precision to a base 39 such as a machine bed. To this end, the base 39 is stepped as shown in FIG. 4 at right angles at 39a, where the track rail 2 is made abutment to the base 39 with the radially inside surface 4 and lower surface 38 of the track rail 2, which provide radially inside reference surface and bottom reference surface for precise mounting, respectively. Thus, the track rail 2 is located with ease and accuracy by virtue of the reference surfaces for mounting and secured the base 39 with fixing bolts 37, which are driven into threaded holes 36 drilled in the base 39.

With the curvilinear rolling-motion guide unit constructed as stated earlier, even when the track rail 2 varies diversely in curvature, only a kind of the end cap 8 may be sufficient because that where the raceways defined between the paired raceway grooves 5 and 11, 6 and 12 are made open as well as where the return passages 15, 16 are opened are unchanged on the end caps 8 irrespective of variation in curvature of the track rail 2. According to the curvilinear motion guide unit of the present invention, thus, only a single type of the end cap may be applied widely to the track rail 2 and casing 7, which are changed depending on specifications in curvature and/or length. This makes the end cap 8 interchangeable, making the control of parts easy.

As stated earlier, the locations the return passages 15, 16 are made opened on the forward and aft end faces 20, 21 are offset closer to the centroidal axis above the track rail 2. Thus, even if the casing 7 is necessarily made great in length in the plan view of FIG. 1, depending on the diverse variations of the track rail 2 in curvature, the return passages 15, 16, despite being bored linearly, won't be formed nearer any of the radially outside and inside surfaces 25, 26 of the casing 7 beyond widthwise any of the radially outside and inside surfaces 3, 4 of the track rail 2. This makes it possible to ensure a radially inside reference plane for mounting, which is spaced apart only at a fixed distance from the centroidal axis of the track rail 2, thereby making the slider 1 compact or slim.

Next referring to FIGS. 5 to 11, the end cap used in the curvilinear motion guide units of the present invention will be explained in detail hereinafter.

Figure 5:
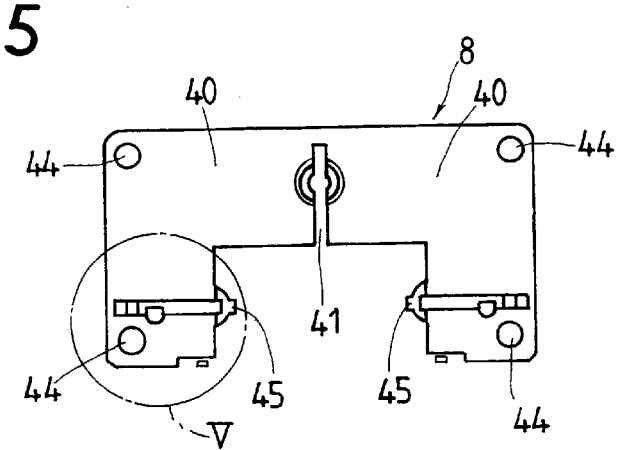
FIG. 5 is a front elevation showing an end cap to be used in the curvilinear motion guide unit of FIG. 1.
Figure 6:
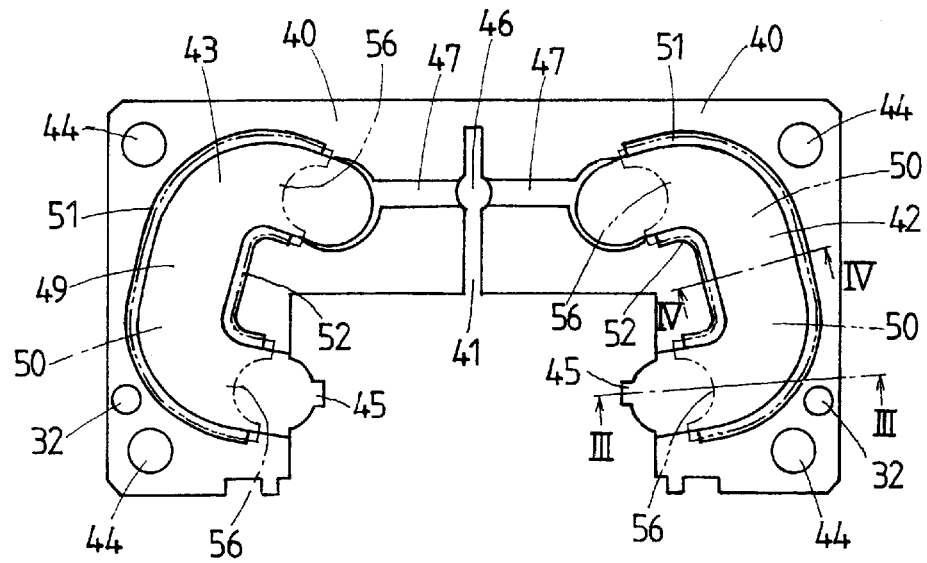
FIG. 6 is a rear elevation of the end cap shown in FIG. 5.

As seen from FIGS. 5 and 6, the end cap 8 is cut deep at the widthwise center thereof to form a slit 41 open to the side facing the track rail 2 to thereby provide cap halves 40, 40 juxtaposed transversely. Alternatively, the end cap 8 may be made of two halves separated completely from one another. To render easy or simple the assembly of the slider 1 on the track rail 2, it is preferable that the halves 40, 40 are much stretched apart from each other at the slit 41 to be easily placed over the track rail 2, and then returned naturally to the original configuration by virtue of elasticity in themselves.

The end cap 8 is made on the backside thereof with turnarounds 42, 43, each of which is a bent passage communicated at one end thereof with any one of raceway grooves 5, 6 and also at opposite end with any one of the return passages 15, 16, which are all formed in the casing 7. The turnarounds 42, 43 are each formed with a synthetic resin-made spacer 55 shown in FIG. 10, which fitted in the backside of the end cap 8 in a socket-and-spigot joint manner. As shown in detail in FIGS. 6, 8 and 9, the end cap 8 is made on the backside thereof with recesses 50, 50, each of which extends obliquely upwards from a location facing any of the raceway grooves 11, 12, with having arced over 180 degrees or more. Moreover, the recesses 50, 50 are each extended around a mouth thereof to make enlarged steps 51, 52, thereby to provide a socket 53 for the socket-and-spigot joint. The spacer 55 is pressed into the socket 53 so as to fit in flush with the backside of the end cap 8 to be brought into abutment against the any associated one of the end faces 20, 21 of the slider 1.

Figure 8:
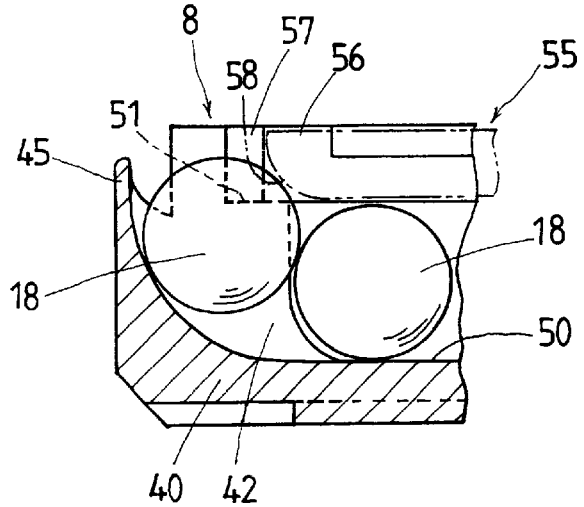
FIG. 8 is a fragmentary sectional view of the end cap of FIG. 6, the view being taken on the plane of the line III—III of that figure.
Figure 9:
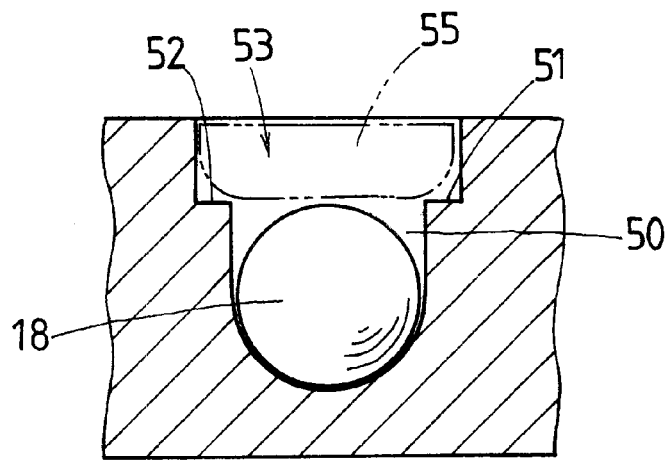
FIG. 9 is a fragmentary sectional view of the end cap of FIG. 6, the view being taken on the plane of the line IV—IV of that figure.
Figure 10:
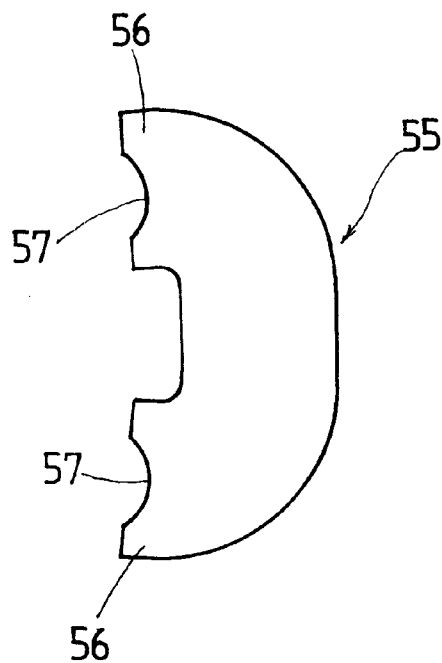
FIG. 10 is a plan view showing a spacer to be fitted in the end cap of FIG. 6 in a socket-and-spigot joint manner.
Figure 11:
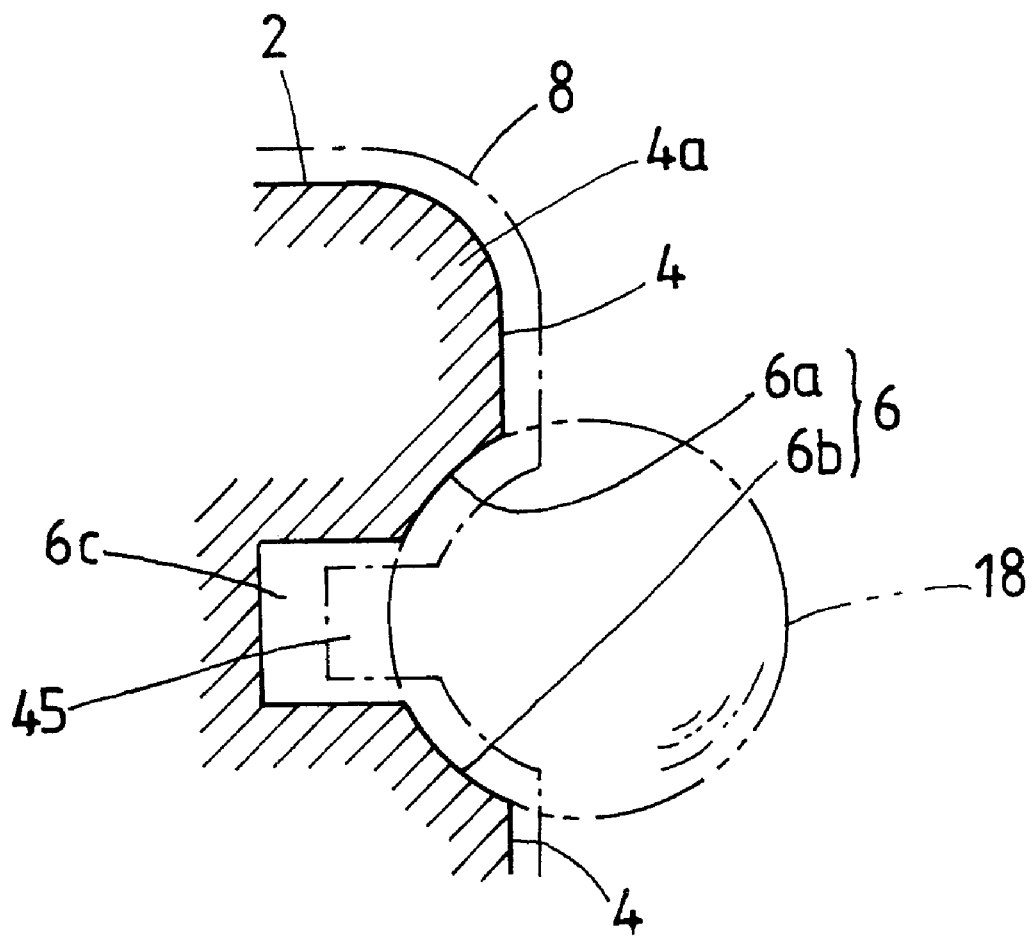
FIG. 11 is a fragmentary enlarged view in section of a raceway groove on a track rail of FIG. 1, to explain the interrelation between the track rail and the end cap.

The recesses 50, 50 are formed in dimension so as to allow the rolling elements 18 to run through them. The recesses 50, 50 covered with the spacers 55 provide tunnellike turnarounds 42, 43. As illustrated in FIGS. 8 and 10, the spacer 55 has widthwise opposite wings 56, 56, which are made at the front thereof with concaved hems 57, 57 that are formed to ensure the rolling elements 18 may have the easy run of the recesses 50, 50 while are made with arced smooth surfaces 58, 58 ranging from the concaved hems 57, 57 to the back of the spacer 55 to make the rolling elements 18 easy to run through the recesses 50, 50. In addition, the end cap 8 is made at four corners thereof with bolt holes 44 in alignment with the threaded holes 34 for the fixing bolts 33.

Figure 7:
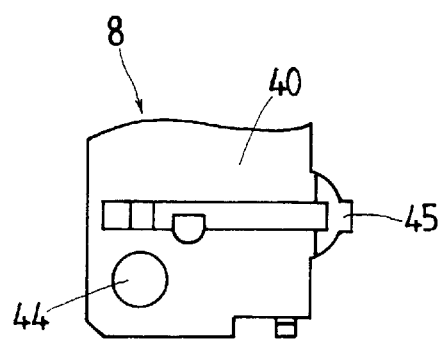
FIG. 7 is a fragmentary enlarged view showing an area encircled with V in the end cap shown in FIG. 5.

In the curvilinear motion guide unit stated earlier, although there is provided no retainer to keep the rolling elements, the end caps 8 are provided with claws 45 as shown in FIGS. 6 to 8, which are fitted for sliding movement in channels 22 made in the raceway grooves 5, 6 on the track rail 2. The claws 45 are to scoop up the rolling elements 18 out of the loaded raceways 13, 14 defined between the raceway grooves 5 in the casing 7 and the raceway grooves 11 on the track rail 2, and then lead the rolling elements 18 to the associated turnarounds 42, 43. Thus, the rolling elements 18 running through the loaded raceways 13, 14 are smoothly scooped out of the raceways 13, 14 and transferred to the turnarounds 42, 43 by means of the claws 45 of any end cap 8 selected depending on the moving direction of the slider 1. Then, the rolling elements 18 are led to the return passages 15, 16 in the casing 7. As the rolling elements 18 reach another end cap 8, they enter the turnarounds 42, 43 in the end cap 8, where the claws 45 feed gently back the rolling elements 18 to the loaded raceways 13, 14. Thus, the rolling elements 18 may recirculate along looped passages 17 from one end cap 8 to the other end cap 8 during curvilinear sliding-movement of the slider 1 along the curved track rail 2.

Figure 2:
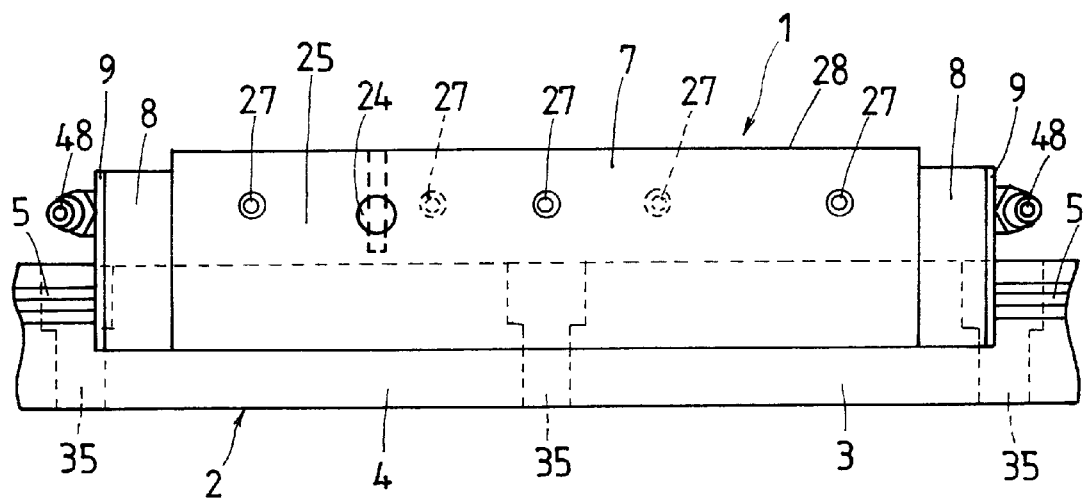
FIG. 2 is a side elevation of the curvilinear motion guide unit shown in FIG. 1.

Each end cap 8 has a grease nipple 48, shown in FIGS. 1 and 2, to supply grease to the turnarounds 42, 43. The grease fed to the grease nipple 48 is applied through a central hole 46 and a widthwise extending path 47, as shown in FIG. 10, to the turnarounds 42, 43 where the rolling elements 18 entrain the grease to the raceway grooves 5, 6, 11 and 12. In FIG. 10, there is shown a relative relation in location between the track rail 2 and the rolling elements 18 in the end cap 8. Formed on the radially inside surface 4 on the track rail 2 is a raceway groove 6 composed of raceway groove sectors 6a, 6b divided with a channel 6c. The rolling elements 18 run on the groove sectors 6a, 6b while the claw 45 in the end cap 8 protrudes into the channel 6c to help scoop the rolling elements 18 out of and land them in the associated raceway.

Figure 12:
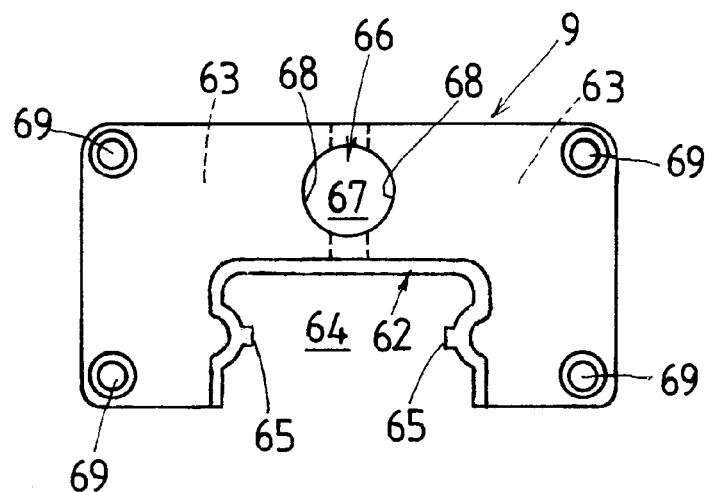
FIG. 12 is a front elevation showing an end seal to be used in the curvilinear motion guide unit shown in FIG. 1.
Figure 13:
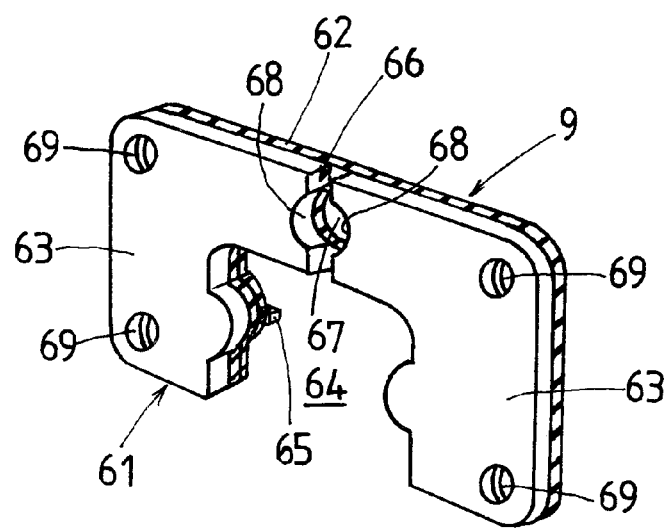
FIG. 13 is a perspective illustration of the end seal of FIG. 12 and is visible from its rear side.

Referring to FIGS. 12 and 13, there is shown an end seal 9 composed of a metal backing plate 61 and a rubber plate 62 bonded to only any one side of the metal backing plate 61. The end seal 9 is assembled to the end cap 8 with the rubber plate 62 facing directly the end cap 8. The rubber plate 62 is formed in an unitary inverted U-shape reduced in depth at the widthwise middle area thereof, whereas the metal backing plate 61 is divided at the widthwise center thereof into two separate backing halves 63, 63. The end seal 9, as only the metal backing plate 61 is completely divided into two separate halves, can be stretched apart to fit astride over the track rail 2 by virtue of the flexing of the rubber plate 62. This helps ensure the easy assembly of the end seal 9 over the track rail 2.

The end seal 9 is provided with convex lips 65, 65 that come into contact with the track rail 2. The lips 65, 65 make contact with the radially outside and inside surfaces 3, 4 of the track rail 2 to seal a clearance S left between the track rail 2 and the slider 1, serve the functions of preventing foreign matter such as debris, and so on from entering into the recess 10 in the slider 1, while keeping lubricant in the raceway grooves 11, 12 against leakage. The end seal 9 is also made with an opening 66 to allow the grease nipple 48 to extend through the end seal 9. To this end, the rubber plate 62 has a through-hole 67, whereas the separate backing halves 63, 63 are partially recessed at 68, 68 in their confronting central edges thereof. Moreover, the end seal 9 is also made at four corners thereof with bolt holes 69 in alignment with the bolt holes 44 for the fixing bolts 33.

Figure 14:
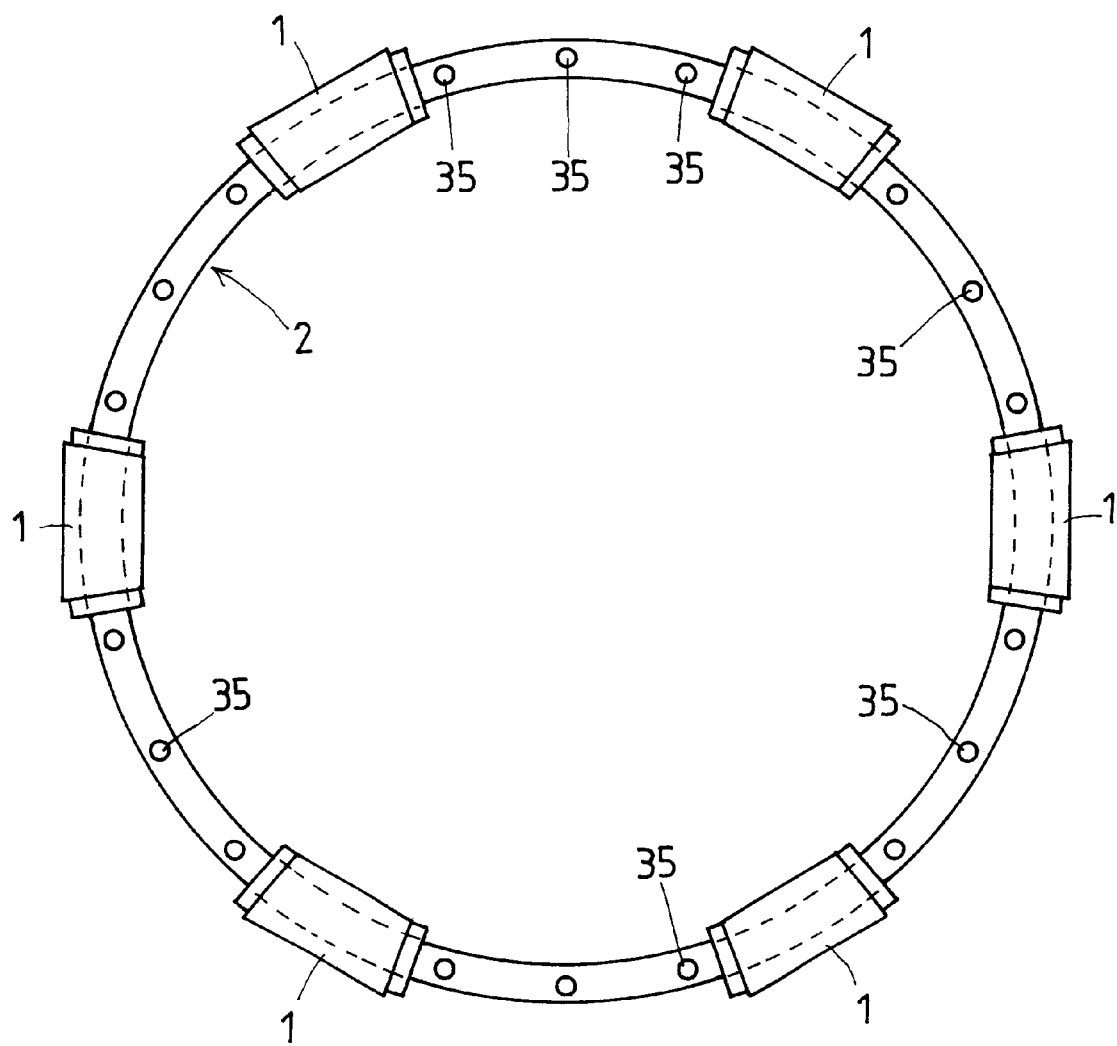
FIG. 14 is a plan view illustrating as a whole the curvilinear motion guide unit according to the present invention.

Finally referring to FIG. 14, which is a plan view showing the entirety of the curvilinear motion guide unit of the present invention, the track rail 2 is formed in a integral loop, over which the sliders 2 ride astride. Although but the sliders 1 are shown arranged at regular intervals along the track rail 2, it will be appreciated that the sliders 1 may be arranged at irregular intervals. The radially inside surface 4 of the looped track rail 2, as shown in FIG. 4, is made with the inside reference surface for mounting and, therefore, the track rail 2 can be simply mounted with precision by abutting the track rail 2 against the stepped corner 39a, which serves as the radially outside reference for mounting of the base 39. Moreover, the track rail 2 made looped may be machined by the use of conventional processing machine for rolling-contact bearings and thus it is easy in fabrication as well as assembly.

What is claimed is:

1. A curvilinear motion guide unit comprising a track rail extending curved with a preselected curvature and having lengthwise side surfaces made thereon with first raceway grooves, and a slider fitting astride over the track rail for movement in a sliding manner along the track rail;

wherein the slider is comprised of a casing provided with second raceway grooves extending curved in conformity with the first raceway grooves and return passages formed corresponding to the second raceway grooves, end caps mounted on forward and aft and faces of the casing, each to each end face, and provided therein with turnarounds connecting the second raceway grooves to the return passages composed of curved raceways defined between the first and second raceway grooves, the turnabouts and the return passages, and end seals attached on the end caps, each to each cap;

wherein the forward and aft end faces of the casing are each arranged such that an imaginary plane including any one of the end faces and normal to a top surface of the track rail coincides with a radial plane extending through the center of curvature of the track rail, and the return passages are opened on the forward and aft end faces at locations that are closer to a centroidal axis of the track rail than locations where the raceways are made open of the forward and aft end faces, and wherein the slider fits astride over radially outside and inside rims of the track rail to conform the track rail, and the return passages are made opened on the forward and aft end faces at locations that are above the outside and inside rims of the track rail and closer to the centroidal axis of the track rail than the outside and inside rims of the track rail.

2. A curvilinear motion guide unit constructed as defined in claim 1, wherein the locations where the return passages in the casing are made open on the forward and aft end faces and the locations where the raceways are made open on the forward and aft end faces always remain in preselected locations irrespective of variations in curvature of the track rail, and the turnarounds in the end caps are formed at locations preselected in conformity with the locations on the end faces, where the return passages and the raceways are made opened.

3. A curvilinear motion guide unit constructed as defined in claim 1, wherein the lengthwise sides of the track rail are radially outside and inside curved surfaces having a common center of curvature coinciding with the center of curvature of the track rail.

4. A curvilinear motion guide unit constructed as defined in claim 1, wherein the slider has widthwise opposing side surfaces extending lengthwise of the slider in parallel with each other.

5. A curvilinear motion guide unit constructed as defined in claim 1, wherein the end caps are each provided therein with a claw to scoop the rolling elements out of the associated raceway, and the first raceway grooves on the track rail are each made with a channel in which a claw fits for movement.

6. A curvilinear motion guide unit constructed as defined in claim 1, wherein both a top surface and any one of the side surfaces of the casing include planar reference surfaces for mounting to locate with precision other member that is to be mounted to the casing.

7. A curvilinear motion guide unit constructed as defined in claim 6, wherein the casing includes mounting surfaces on which the other member is fixed, the mounting surfaces being drilled with threaded holes.

8. A curvilinear motion guide unit constructed as defined in claim 1, wherein the track rail is formed in a loop, over which the sliders ride astride for curvilinear movement.

9. A curvilinear motion guide unit comprising a track rail extending curved with a preselected curvature and having lengthwise side surfaces made thereon with first raceway grooves, and a slider fitting astride over the track rail for movement in a sliding manner along the track rail;
   wherein the slider is comprised of a casing provided with second raceway grooves and return passages formed corresponding to the second raceway grooves, end caps mounted on forward and aft end faces of the casing, each to each end face, and provided therein with turnarounds connecting the second raceway grooves to the return passages, rolling elements running through recirculating passages composed of curved raceways defined between the first and second raceway grooves, the turnarounds and the return passages, and end seals attached on the end caps, each to each cap;
   wherein the forward and aft end faces of the casing are each arranged such that an imaginary plane including any one of the end faces and normal to a top surface of the track rail coincides with a radial plane extending through the center of curvature of the track rail, and the return passages are opened on the forward and aft end faces at locations that are closer to a centroidal axis of the track rail than locations where the raceways are made open of the forward and aft end faces, and
   wherein the return passages made in the casing are linear bores that run straight through the casing from any one of the forward and aft end faces to the other.

10. A curvilinear motion guide unit constructed as defined in claim 9, wherein the locations where the return passages in the casing are made open on the forward and aft faces and the locations where the raceways are made open on the forward and aft end faces always remain in preselected locations irrespective of variations in curvature of the track rail, and the turnarounds in the end caps are formed at locations preselected in conformity with the locations on the end faces, where the return passages and the raceways are made open.

11. A curvilinear motion guide unit constructed as defined in claim 9, wherein the lengthwise sides of the track rail are radially outside and inside curved surfaces having a common center of curvature coinciding with the center of curvature of the track rail.

12. A curvilinear motion guide unit constructed as defined in claim 9, wherein the slider has widthwise opposing side surfaces extending lengthwise of the slider in parallel with each other.

13. A curvilinear motion guide unit constructed as defined in claim 9, wherein the end caps are each provided therein with a claw to scoop the rolling elements out of the associated raceway, and the first raceway grooves on the track rail are each made with a channel in which a claw fits for movement.

14. A curvilinear motion guide unit constructed as defined in claim 9, wherein both a top surface and any one of the side surfaces of the casing include planar reference surfaces for mounting to locate with precision other member that is to be mounted to the casing.

15. A curvilinear motion guide unit constructed as defined in claim 14, wherein the casing includes mounting surfaces on which the other member is fixed, the mounting surfaces being drilled with threaded holes.

16. A curvilinear motion guide unit constructed as defined in claim 9, wherein the track rail is formed in a loop, over which the sliders ride astride for curvilinear movement.

17. A curvilinear motion guide unit comprising a track rail extending curved with a preselected curvature and having lengthwise side surfaces made thereon with first raceway grooves, and a slider fitting astride over the track rail for movement in a sliding manner along the track rail;
   wherein the slider is comprised of a casing provided with second raceway grooves and return passages formed corresponding to the second raceway grooves, end caps mounted on forward and aft end faces of the casing, each to each end face, and provided therein with turnarounds connecting the second raceway grooves to the return passages, rolling elements running through recirculating passages composed of curved raceways defined between the first and second raceway grooves, the turnarounds and the return passages, and end seals attached on the end caps, each to each cap;
   wherein the forward and aft end faces of the casing are each arranged such that an imaginary plane including any one of the end faces and normal to a top surface of the track rail coincides with a radial plane extending through the center of curvature of the track rail, and the return passages are opened on the forward and aft end faces at locations that are closer to a centroidal axis of the track rail than locations where the raceways are made open of the forward and aft end faces, and
   wherein the casing is made with admission holes through which a desired number of the rolling elements may be charged into the recirculating passages, and the admission holes are communicated to the return passages and may be closed with plugs.

18. A curvilinear motion guide unit comprising a track rail extending curved with a preselected curvature and having lengthwise side surfaces made thereon with first raceway grooves, and a slider fitting astride over the track rail for movement in a sliding manner along the track rail;
   wherein the slider is comprised of a casing provided with second raceway grooves extending curved in conformity with the first raceway grooves and return passages formed corresponding to the second raceway grooves, end caps mounted on forward and aft end faces of the casing, each to each end face, and provided therein with turnarounds connecting the second raceway grooves to the return passages, rolling elements running through recirculating passages composed of curved raceways defined between the first and second raceway grooves, the turnarounds and the return passages, and end seals attached on the end caps, each to each cap;

wherein the forward and aft end faces of the casing are each arranged such that an imaginary plane including any one of the end faces and normal to a top surface of the track rail coincides with a radial plane extending through the center of curvature of the track rail, and the return passages are opened on the forward and aft end faces at locations that are closer to a centroidal axis of the track rail than locations where the raceways are made open of the forward and aft end faces, and wherein the end cap is cut deep to form a slit open to the side facing the track rail so that the end cap, when fitting astride over the track rail, may be stretched apart at the slit to be easily placed over the track rail.

19. A curvilinear motion guide unit constructed as defined in claim 17, wherein the lengthwise sides of the track rail are radially outside and inside curved surfaces having a common center of curvature coinciding with the center of curvature of the track rail.

20. A curvilinear motion guide unit comprising a track rail extending curved with a preselected curvature and having lengthwise side surfaces made thereon with first raceway grooves, and a slider fitting astride over the track rail for movement in a sliding manner along the track rail;

wherein the slider is comprised of a casing provided with second raceway grooves extending curved in conformity with the first raceway grooves and return passages formed corresponding to the second raceway grooves, end caps mounted on forward and aft end faces of the casing, each to each end face, and provided therein with turnarounds connecting the second raceway grooves to the return passages, rolling elements running through recirculating passages composed of curved raceways defined between the first and second raceway grooves, the turnarounds and the return passages, and end seals attached on the end caps, each to each cap;

wherein the forward and aft end faces of the casing are each arranged such that an imaginary plane including any one of the end faces and normal to a top surface of the track rail coincides with a radial plane extending through the center of curvature of the track rail, and the return passages are opened on the forward and aft end faces at locations that are closer to a centroidal axis of the track rail than locations where the raceways are made open of the forward and aft end faces, and wherein the end seal is composed of a rubber plate and a metal backing plate bonded to the rubber plate, the metal backing plate being comprised of a pair of backing halves to be stretched apart from each other when the end seal is placed astride over the track rail.

* * * * *